US010827124B2

(12) United States Patent
Imanishi

(10) Patent No.: US 10,827,124 B2
(45) Date of Patent: Nov. 3, 2020

(54) SHAKE CORRECTION DEVICE, IMAGING APPARATUS, AND SHAKE CORRECTION METHOD

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 16/360,497

(22) Filed: Mar. 21, 2019

(65) Prior Publication Data

US 2019/0222767 A1 Jul. 18, 2019

Related U.S. Application Data

(63) Continuation of application No. PCT/JP2017/036962, filed on Oct. 12, 2017.

(30) Foreign Application Priority Data

Oct. 13, 2016 (JP) .................................. 2016-201793

(51) Int. Cl.
*H04N 5/232* (2006.01)
*H04N 5/225* (2006.01)
*G03B 5/00* (2006.01)

(52) U.S. Cl.
CPC ........... *H04N 5/23287* (2013.01); *G03B 5/00* (2013.01); *H04N 5/2254* (2013.01); *H04N 5/23258* (2013.01); *H04N 5/232122* (2018.08)

(58) Field of Classification Search
CPC ......... H04N 5/23287; H04N 5/232122; H04N 5/2254; H04N 5/23258; H04N 5/2328;
(Continued)

(56) References Cited

U.S. PATENT DOCUMENTS 7,970,266 B2* 6/2011 Hashi ..................... G03B 5/00
   348/208.4
8,711,272 B2* 4/2014 Noto .................... G02B 27/646
   348/208.2
(Continued)

FOREIGN PATENT DOCUMENTS

CN 101035205 A 9/2007
CN 101072301 A 11/2007
(Continued)

OTHER PUBLICATIONS

International Preliminary Report on Patentability and Written Opinion of the International Searching Authority, dated Apr. 25, 2019, for International Application No. PCT/JP2017/036962, with an English translation of the Written Opinion.

(Continued)

*Primary Examiner* — Pritham D Prabhakher
(74) *Attorney, Agent, or Firm* — Birch, Stewart, Kolasch & Birch, LLP

(57) ABSTRACT

An object of the present invention is to provide a shake correction device, an imaging apparatus, and a shake correction method capable of accurately correcting a parallel shake. According to a shake correction device according to an aspect of the present invention, since a rotation radius to be used in correction of a shake is determined based on a calculated rotation radius and whether or not a polarity corresponding to the calculated rotation radius is different from a polarity corresponding to a rotation radius stored in advance and an image blur is corrected based on a correction amount corresponding to the determined rotation radius, it is possible to accurately correct a parallel shake by taking influence on a polarity of correction due to the updating of the rotation radius into consideration. The "rotation radius stored in advance" may be a fixed value or may be updated (Continued)

during a period of the shake correction. The shake correction can be performed by displacing a shake correction lens and/or an imaging element.

9 Claims, 14 Drawing Sheets

(58) Field of Classification Search
CPC .................. H04N 5/23248; G03B 5/00; G03B 2205/0007; G03B 2217/005; G02B 27/64
USPC ........................................................ 348/208.1
See application file for complete search history.

(56) References Cited

U.S. PATENT DOCUMENTS

| | | | |
|---|---|---|---|
| 9,131,156 B2* | 9/2015 | Tsuchiya | G02B 27/646 |
| 9,386,225 B2* | 7/2016 | Tsuchiya | H04N 5/23258 |
| 9,813,627 B2* | 11/2017 | Wakamatsu | H04N 5/23287 |
| 10,051,183 B2* | 8/2018 | Yoneda | H04N 5/23287 |
| 2007/0212043 A1 | 9/2007 | Izawa | |
| 2007/0266312 A1 | 11/2007 | Ayaki et al. | |
| 2010/0215353 A1 | 8/2010 | Hashi et al. | |
| 2010/0245603 A1* | 9/2010 | Hashi | H04N 5/23258 |
| | | | 348/208.5 |
| 2010/0315520 A1* | 12/2010 | Noto | H04N 5/23248 |
| | | | 348/208.11 |
| 2012/0038783 A1* | 2/2012 | Noto | G02B 27/646 |
| | | | 348/208.2 |
| 2012/0093493 A1* | 4/2012 | Wakamatsu | H04N 5/23287 |
| | | | 396/55 |
| 2013/0162847 A1* | 6/2013 | Miyazawa | H04N 5/23248 |
| | | | 348/208.1 |
| 2013/0163084 A1* | 6/2013 | Miyazawa | G03B 5/00 |
| | | | 359/554 |
| 2013/0163972 A1 | 6/2013 | Miyazawa | |
| 2014/0036101 A1 | 2/2014 | Imanishi | |
| 2014/0146191 A1* | 5/2014 | Tsuchiya | G03B 5/00 |
| | | | 348/208.2 |
| 2014/0204226 A1 | 7/2014 | Murakami et al. | |
| 2014/0327789 A1 | 11/2014 | Tsuchiya et al. | |
| 2015/0042827 A1 | 2/2015 | Noguchi | |
| 2015/0042828 A1* | 2/2015 | Wakamatsu | H04N 5/23254 |
| | | | 348/208.4 |
| 2015/0172546 A1 | 6/2015 | Takeuchi | |
| 2016/0057352 A1* | 2/2016 | Yoneda | H04N 5/23287 |
| | | | 348/208.4 |
| 2016/0330377 A1 | 11/2016 | Tsuchiya | |

FOREIGN PATENT DOCUMENTS

| | | |
|---|---|---|
| CN | 103176332 A | 6/2013 |
| CN | 103477277 A | 12/2013 |
| CN | 104067166 A | 9/2014 |
| CN | 105191283 A | 12/2015 |
| CN | 105430245 A | 3/2016 |
| CN | 105934708 A | 9/2016 |
| EP | 2 874 003 A1 | 5/2015 |
| JP | 2004-295027 A | 10/2004 |
| JP | 2012-247544 A | 12/2012 |
| JP | 2013-54316 A | 3/2013 |
| JP | 2013-195108 A | 9/2013 |
| JP | 2014-206660 A | 10/2014 |
| JP | 5693656 B2 | 4/2015 |
| JP | 2015-114534 A | 6/2015 |
| JP | 5846927 B2 | 1/2016 |
| WO | WO 2009/060626 A1 | 5/2009 |
| WO | WO 2010/143485 A1 | 12/2010 |
| WO | WO 2013/108434 A1 | 7/2013 |
| WO | WO 2014/192464 A1 | 12/2014 |

OTHER PUBLICATIONS

International Search Report dated Jan. 16, 2018 for International Application No. PCT/JP2017/036962, with an English translation.
Office Action dated Aug. 20, 2020 in counterpart Chinese Patent Application No. 201780063256.9, with English translation.

* cited by examiner

SHAKE CORRECTION DEVICE, IMAGING APPARATUS, AND SHAKE CORRECTION METHOD

CROSS-REFERENCE TO RELATED APPLICATIONS

The present application is a Continuation of PCT International Application No. PCT/JP2017/036962 filed on Oct. 12, 2017 claiming priority under 35 U.S.C § 119(a) to Japanese Patent Application No. 2016-201793 filed on Oct. 13, 2016. Each of the above applications is hereby expressly incorporated by reference, in their entirety, into the present application.

BACKGROUND OF THE INVENTION

1. Field of the Invention

The present invention relates to a shake correction device, an imaging apparatus, and a shake correction method, and particularly, to a shake correction device that corrects image blur caused by a shake such as a camera shake, an imaging apparatus comprising such a shake correction device, and a shake correction method of correcting image blur caused by a shake such as a camera shake.

2. Description of the Related Art

In recent years, a camera having a shake correction function for preventing image blur caused by a camera shake has been generally used. As the camera shake, there are an angular shake caused by the rotation of a camera and a parallel shake caused by the movement of the camera in upper, lower, left, and right directions. Many cameras correct only the image blur caused by the angular shake until now. However, since the parallel shake is largely influenced in a case where imaging at an image zoom ratio such as close-up imaging using a microlens is performed, the image blur caused by the parallel shake is corrected nowadays. A technology in which the calculation and correction of the shake amount of the parallel shake are performed by using the parallel shake as the "angular shake equivalent to the parallel shake" has been known.

For example, JP5693656B describes an anti-shake control device configured such that two shake detection means for detecting a shake by different methods, correction values are calculated by outputs of these shake detection means, the outputs of the shake detection means are corrected, and the shake correction means are driven based on the corrected output. JP5846927B describes a shake amount detection device configured such that an angular velocity sensor which detects yaw, pitch, and roll angular velocities and an acceleration sensor which detects X and Y accelerations in X- and Y-axis directions are comprised, an X velocity is obtained by adding a first component and a second component of the X velocity calculated from outputs of these sensors, and the movement amount in the X-axis direction is calculated by integrating the X velocity for time.

SUMMARY OF THE INVENTION

As stated above, in a case where the parallel shake is used as the "angular shake equivalent to the parallel shake", the rotation radius in a case where the parallel shake is the "angular shake" is calculated, and a displacement amount and a polarity (direction) of a correction mechanism are determined based on the rotation radius. Such processing is repeatedly and continuously performed during an exposure period, and the rotation radius (and the displacement amount and the direction thereof based on the rotation radius) are successively updated. At this time, the correction amount becomes zero depending on the value of the rotation radius in some cases, and the polarity of the correction is changed from a positive value to a negative value or from the negative value to the positive value in a case where the rotation radius is changed near such a value. In a case where the polarity is incorrect in such a situation, there is a concern that the influence of the shake will be increased due to the correction or there is a concern that the operation of the correction mechanism will be unstable due to the frequent change in polarity. Accordingly, it is necessary to take the polarity into consideration in addition to the displacement amount in order to perform accurate correction. However, the related art has not sufficiently taken these points into consideration. For example, JP5693656B described above uses the correction amount stored in advance in a case where the reliability of the calculated rotation radius is low and JP5846927B describes that the rotation radius having low reliability is zero. However, JP5693656B and JP5846927B have not taken the influence on the polarity of the correction due to the updating of the rotation radius.

As stated above, the related art has not been able to accurately correct the parallel shake.

The present invention has been made in view of such circumstances, and an object of the present invention is to a shake correction device, an imaging apparatus, and a shake correction method capable of accurately correcting a parallel shake.

In order to achieve the aforementioned object, a shake correction device according to a first aspect of the present invention comprises: an angular velocity detection unit that detects an angular velocity of a shake; an acceleration detection unit that detects an acceleration of the shake; a rotation radius calculation unit that calculates a rotation radius around a reference surface of the shake based on the detected angular velocity and acceleration; a correction calculation unit that calculates a correction amount per unit shake angle and a polarity of correction for the shake based on the calculated rotation radius; a rotation radius determination unit that determines a rotation radius to be used in the correction of the shake based on the calculated rotation radius and whether or not the polarity corresponding to the calculated rotation radius is different from a polarity corresponding to a rotation radius stored in advance; and a shake correction unit that performs the correction for the shake based on a correction amount and a polarity corresponding to the determined rotation radius.

According to the first aspect, since a rotation radius to be used in correction of a shake is determined based on a calculated rotation radius and whether or not a polarity corresponding to the calculated rotation radius is different from a polarity corresponding to a rotation radius stored in advance and an image blur is corrected based on a correction amount and a polarity corresponding to the determined rotation radius, it is possible to accurately correct a parallel shake by taking influence on a polarity of correction due to the updating of the rotation radius into consideration. In the first aspect and the following aspects, the "rotation radius stored in advance" may be a fixed value or may be updated during a period of the shake correction.

In the first aspect, the shake correction can be performed during an exposure period of a live view image mode, a static image mode, or a video mode. The shake correction can be performed by displacing the shake correction lens and/or the imaging element.

In the first aspect, it is possible to use an image surface of the imaging element as the reference surface of the shake.

In the first aspect, in the shake correction device according to a second aspect, the correction calculation unit calculates the correction amount and the polarity for the shake while referring to a relationship between the rotation radius and the correction amount per unit shake angle and the polarity of the correction. The second aspect illustrates an example of a specific aspect of the calculation of the correction amount and the polarity.

In the first or second aspect, in the shake correction device according to a third aspect, in a case where the polarity corresponding to the calculated rotation radius is different from the polarity corresponding to the rotation radius stored in advance and a difference between the calculated rotation radius and the rotation radius stored in advance is larger than a rotation radius calculation threshold value, the rotation radius determination unit determines the calculated rotation radius as the rotation radius to be used in the correction of the shake. Even in a case where the polarity corresponding to the calculated rotation radius is different from the polarity corresponding to the rotation radius stored in advance, there is a possibility of a calculation error in a case where the change amount of the rotation radius is small (equal to or smaller than a threshold value). Thus, in the third aspect, in a case where the polarity corresponding to the calculated rotation radius is different from the polarity corresponding to the rotation radius stored in advance and the difference between the calculated rotation radius and the rotation radius stored in advance is larger than the rotation radius calculation threshold value, the calculated rotation radius is determined as the rotation radius to be used in the shake correction. Accordingly, in a case where it is certain that the rotation radius is changed and the polarity of the correction is consequently changed, since the calculated rotation radius can be determined as the rotation radius to be used in the shake correction, it is possible to accurately correct the parallel shake, and it is possible to prevent an erroneous operation due to a frequent change in polarity.

In the first or second aspect, in the shake correction device according to a fourth aspect, in a case where the polarity corresponding to the calculated rotation radius is different from the polarity corresponding to the rotation radius stored in advance and a difference between the calculated rotation radius and a rotation radius at which the correction amount is zero is larger than a threshold value, the rotation radius determination unit determines the calculated rotation radius as the rotation radius to be used in the correction of the shake. The fourth aspect illustrates another aspect corresponding to a case where the polarity of the correction is changed, in a case where it is certain that the rotation radius is changed and the polarity of the correction is consequently changed, since the calculated rotation radius can be determined as the rotation radius to be used in the shake correction, it is possible to accurately correct the parallel shake, and it is possible to prevent an erroneous operation due to a frequent change in polarity.

In the first or second aspect, in the shake correction device according to a fifth aspect, in a case where the polarity corresponding to the calculated rotation radius is different from the polarity corresponding to the rotation radius stored in advance, the rotation radius determination unit determines a rotation radius set between the rotation radius stored in advance and a rotation radius at which the correction amount is zero as the rotation radius to be used in the correction of the shake. The fifth aspect illustrates still another aspect corresponding to the case where the polarity of the correction is changed, it is possible to perform the correction at the same polarity as the polarity for the rotation radius stored in advance. Accordingly, it is possible to accurately correct the parallel shake, and it is possible to prevent the erroneous operation due to the frequent change in polarity. In the fifth aspect, the rotation radius stored in advance, the rotation radius at which the correction amount is zero, and any rotation radius between these two rotation radii can be determined as the rotation radius to be used in the shake correction.

In any one of the first to fifth aspects, in the shake correction device according to a sixth aspect further comprises a reliability degree calculation unit that calculates a degree of reliability of the rotation radius. In a case where the calculated degree of reliability is equal to or smaller than a threshold value, the rotation radius determination unit determines the rotation radius stored in advance instead of the calculated rotation radius as the rotation radius to be used in the correction of the shake. According to the sixth aspect, since it is possible to accurately correct the parallel shake by taking the degree of reliability of the rotation radius into consideration and the rotation radius stored in advance instead of the calculated rotation radius is determined as the rotation radius to be used in the correction of the shake in a case where the degree of reliability is equal to or smaller than the threshold value, it is possible to prevent the erroneous operation due to the frequent change in polarity. It is possible to determine the degree of reliability of the rotation radius based on the value or sign of the angular velocity or the value or sign of the rotation radius.

In any one of the first to sixth aspects, in the shake correction device according to a seventh aspect, the rotation radius determination unit updates the rotation radius stored in advance based on the determined rotation radius. In the seventh aspect, since the rotation radius stored in advance is updated based on the determined rotation radius, it is possible to appropriately take the change in rotation radius into consideration, and it is possible to accurately correct the parallel shake based on the change in rotation radius. The "updating" of the rotation radius may be performed by replacing the rotation radius stored in advance with the determined rotation radius, or may be performed by calculating a new value acquired by taking the determined rotation radius (for example, an average value acquired by taking the history of changes in rotation radius into consideration).

In order to achieve the aforementioned object, an imaging apparatus according to an eighth aspect of the present invention comprises: an imaging optical system; an imaging element on which an optical image of a subject is formed by the imaging optical system; and the shake correction device according to any one of the first to seventh aspects. The shake correction unit performs the correction for the shake by driving at least one of the imaging optical system or the imaging element at the calculated correction amount and polarity in a plane perpendicular to an optical axis of the imaging optical system. In the eighth aspect, in a case where the imaging optical system is driven, it is possible to correct the image blur by driving the lens for shake correction.

In order to achieve the aforementioned object, a shake correction method according to a ninth aspect of the present invention comprises: an angular velocity detection step of detecting an angular velocity of a shake; an acceleration detection step of detecting an acceleration of the shake; a rotation radius calculation step of calculating a rotation radius around a reference surface of the shake based on the detected angular velocity and acceleration; a correction calculation step of calculating a correction amount per unit shake angle and a polarity of correction for the shake based on the calculated rotation radius; a rotation radius determination step of determining a rotation radius to be used in the correction of the shake based on the calculated rotation radius and whether or not the polarity corresponding to the calculated rotation radius is different from a polarity corresponding to a rotation radius stored in advance; and a shake correction step of performing the correction for the shake based on a correction amount and a polarity corresponding to the determined rotation radius. In the ninth aspect, it is possible to accurately correct the parallel shake as in the first aspect. The ninth aspect may include the same configuration as those of the second to seventh aspects.

As described above, according to the shake correction device, the imaging apparatus, and the shake correction method of the present invention, it is possible to accurately correct the parallel shake.

DESCRIPTION OF THE PREFERRED EMBODIMENTS

Hereinafter, embodiments of a shake correction device, an imaging apparatus, and a shake correction method according to the present invention will be described with reference to the accompanying drawings.

First Embodiment

Configuration of Digital Camera

Figure 1:
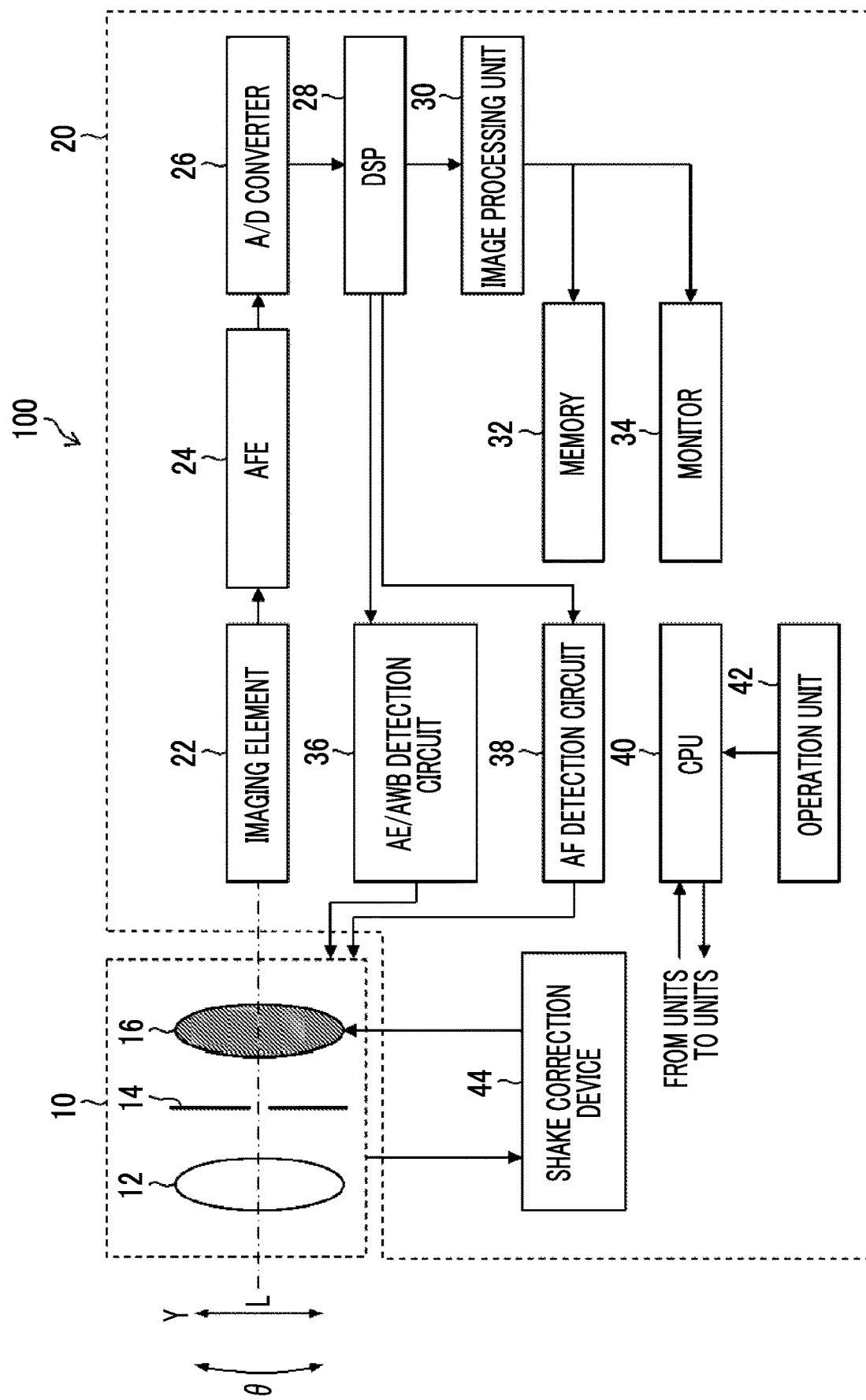
FIG. 1 is a block diagram showing a configuration of a digital camera according to a first embodiment.

FIG. 1 is a block diagram showing a configuration of a digital camera 100 (imaging apparatus) according to a first embodiment. As shown in FIG. 1, the digital camera 100 includes an imaging optical system 10 (imaging optical system) and a camera main body 20, and the imaging optical system 10 includes an imaging lens 12, a stop 14, and a shake correction lens 16. Meanwhile, the camera main body 20 comprises an imaging element 22 (imaging element), an AFE 24 (AFE: Analog Front End), an A/D converter 26 (A/D: Analog to Digital), a DSP 28 (DSP: Digital Signal Processor), an image processing unit 30, a memory 32, a monitor 34, an AE/AWB detection circuit 36 (AE: Auto Exposure, AWB: Auto White Balance), a CPU 40 (CPU: Central Processing Unit), and an operation unit 42.

The imaging lens 12 of the imaging optical system 10 is a lens provided so as to be movable along an optical axis L during zooming or focus adjustment. Only one imaging lens 12 is shown in FIG. 1. However, the imaging lens 12 is composed of a plurality of lenses, and includes a zoom lens driven during zooming and a focus lens driven during focus adjustment. The stop 14 has an opening formed by a plurality of stop leaf blades on the optical axis L, and adjusts an exposure amount by moving the positions of the stop leaf blades and adjusting the size of the opening.

The shake correction lens 16 is provided so as to be movable in a direction perpendicular to the optical axis L, and is driven in an orientation in which a camera shake is removed in a case where the camera shake (an angular shake and a shift shake) is caused in the digital camera 100. The shake correction lens 16 is driven by an actuator such as a voice coil motor (VCM) or a stepping motor. The driving direction or driving amount of the shake correction lens 16 is controlled by a shake correction device 44.

For example, the imaging element 22 is a charge coupled device (CCD) imaging element or a complementary metal-oxide semiconductor (CMOS) imaging element, and an optical image of a subject is formed by the imaging optical system 10. A plurality of pixels having color filters is arranged in a matrix form on an imaging surface, and an image of the subject is captured by photoelectrically converting light incident from the subject for each pixel. Imaging signals output by the imaging element 22 are input to the AFE 24. Noise is removed from the imaging signals through correlative double sampling, and the imaging signals are amplified. The imaging signals from which the noise is removed and which are amplified by the AFE 24 are converted into digital image data by the A/D converter 26, and are input to the DSP 28. In a case where the imaging element 22 is the CMOS imaging element, the A/D converter 26 is built in the imaging element 22 in many cases.

The DSP 28 functions as an image quality correction processing circuit that performs signal processing such as gradation correction processing or gamma-correction processing on the input image data or a compression/decompression processing circuit that compresses and/or decompresses the image data in a format of the Joint Photographic Experts Group (JPEG). The image data on which various correction processing is performed by the DSP 28 is input to the image processing unit 30, and image processing such as contour enhancement processing is performed on the input image data. The image data on which the image processing is performed by the image processing unit 30 can be stored in the memory 32 and can be displayed on the monitor 34.

An AF detection circuit 38 (AF: Auto Focus) is a circuit that detects a focal length based on the image data output from the DSP 28. The AF detection circuit outputs a focus evaluation value acquired by extracting high-frequency components from an AF detection region set within the image data and integrally accumulates the extracted high-frequency components. The AF detection circuit automatically performs focusing by moving the focus lens (imaging lens 12) of the imaging optical system 10 along the optical axis L by using a focus motor such that contrast within the AF detection region is maximized based on the focus evaluation value. Focus control using a phase difference method may be performed instead of focus control using such a contrast AF method. In a case where the focus control using the phase difference method is performed, the focus lens is controlled such that a defocus amount obtained from phase difference data calculated by using pixels having a plurality of phase differences within the focus region of the image data is zero. In a case where the phase difference method is used, the imaging element for phase difference AF may be separately provided, and AF processing may be performed by using the phase difference detected by the imaging element for phase difference AF.

The AE/AWB detection circuit 36 detects whether or not white balance is appropriate for imaging, and detects an exposure amount appropriate for imaging based on the image data output from the DSP 28. The AE/AWB detection circuit adjusts the size of the opening of the stop 14 or the speed of an electronic shutter of the imaging element 22 such that the exposure amount is appropriate.

The shake correction device 44 obtains an angular velocity $\omega$ generated by the rotation of the digital camera 100 from an output value of an angular velocity sensor 60 (see FIG. 3), obtains a translational acceleration $\alpha$ generated by parallel movement from an output value of an acceleration sensor 50 (see FIG. 3), calculates a camera shake caused in the digital camera 100 based on the angular velocity $\omega$ and the translational acceleration $\alpha$, and corrects the calculated camera shake. As the camera shake calculated by the shake correction device 44, there are two kinds of an angular shake $\theta$ caused by the rotation of the optical axis L and a shift shake (parallel shake) caused by parallel movement in a plane perpendicular to the optical axis L. The shake correction device 44 calculates the angular shake $\theta$ and the shift shake Y based on the angular velocity $\omega$ and the translational acceleration $\alpha$, and calculates a shake amount based on the calculated shakes. The shake amount is input to an actuator to be described below, and the actuator drives the shake correction lens 16 so as to remove the input shake amount.

The CPU 40 generally controls the units of the digital camera 100 according to a user operation using the operation unit 42. For example, in a case where a release button is operated (for example, a halfway push-operation for pushing the release button to a halfway of a stroke), the CPU 40 performs automatic focus adjustment by using the AF detection circuit 38, and automatically adjusts the exposure amount by using the AE/AWB detection circuit 36. The CPU 40 performs shake correction processing to be described below in a case where the digital camera 100 is set in a live view image mode, a static image imaging mode, or a video imaging mode. The CPU may perform the shake correction processing based on whether or not a user executes a command to perform the shake correction processing through the operation unit 42 in addition to the imaging mode of the digital camera 100.

Angular Shake and Shift Shake

Next, the shake correction processing using the digital camera 100 according to the first embodiment will be described. As described above, the digital camera 100 calculates the angular shake $\theta$ and the shift shake Y caused by the camera shake by using the shake correction device 44, and corrects these shakes.

Figure 2:
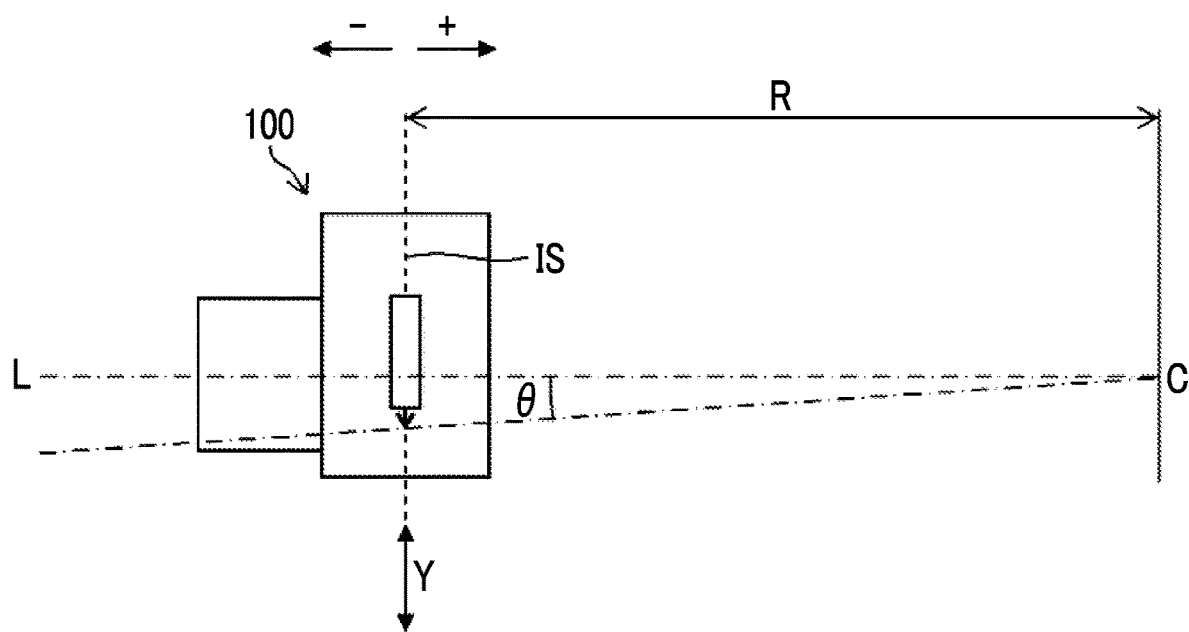
FIG. 2 is a diagram showing an angular shake and a shift shake of the digital camera.

FIG. 2 is a schematic diagram for describing the angular shake $\theta$ and the shift shake Y in the digital camera 100 according to the first embodiment. As shown in FIG. 2, the angular shake $\theta$ is a shake caused by the rotation of the optical axis L around a rotation center C, and a rotation radius R is, for example, a distance from the rotation center C to an image surface IS. The angular shake $\theta$ is calculated by integrating the angular velocity $\omega$, and the rotation radius R is calculated based on the translational acceleration $\alpha$ and the angular velocity $\omega$ generated by the shift shake Y as will be described below. The shift shake Y is a shake caused by the parallel movement of the digital camera 100 in the plane perpendicular to the optical axis L, and is expressed by $Y=R\theta$ by using the angular shake $\theta$ and the rotation radius R.

The "rotation radius R is a plus (positive) value" in a case where the rotation center C is present so as to be closer to the user than the digital camera 100 as shown in FIG. 2 (is present on the right side of FIG. 2), and the "rotation radius R is a minus (negative) value" in a case where the rotation center C is present so as to be closer to the subject than the digital camera 100 (is present on the left side of FIG. 2). The shift shake Y is a shake caused in the plane perpendicular to the optical axis L.

Configuration of Shake Correction Device

Figure 3:
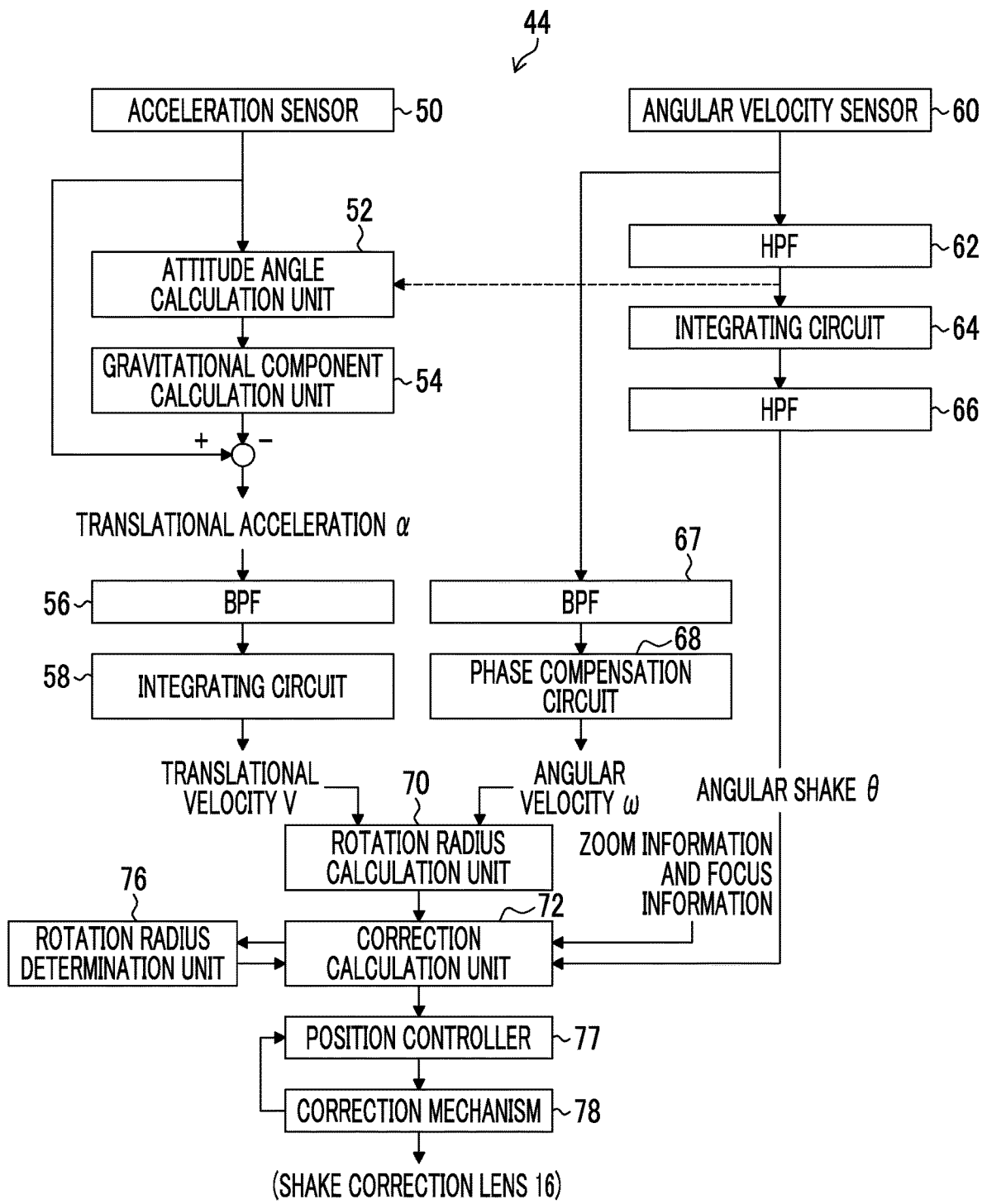
FIG. 3 is a schematic diagram showing a configuration of a shake correction device and shake correction processing.

FIG. 3 is a block diagram showing a configuration a portion (shake correction device 44) related to the shake correction processing of the digital camera 100 according to the first embodiment. As shown in FIG. 3, the shake correction device 44 comprises the acceleration sensor 50 (acceleration detection unit) and the angular velocity sensor 60 (angular velocity detection unit). The shake correct calculates the shake amount based on an output signal (hereinafter, referred to as an acceleration signal) of the acceleration sensor 50 and an output signal (hereinafter, referred to as an angular velocity signal) of the angular velocity sensor 60, and controls the movement direction and movement amount of the shake correction lens 16 based on the calculated shake amount.

The acceleration signal output from the acceleration sensor 50 is input to an attitude angle calculation unit 52, and an attitude angle is calculated. A gravitational acceleration component of the attitude angle is calculated by a gravitational component calculation unit 54 from this result. The angular velocity signal processed in an HPF 62 (HPF: High Pass Filter) is also used in the calculation of the attitude angle. The gravitational acceleration component is subtracted from the acceleration signal, and the gravitational acceleration component is removed. Thus, the translational acceleration $\alpha$ is calculated (detected). The series of processing for calculating the translational acceleration from the acceleration signal constitutes an acceleration detection step. The series of components (including the acceleration sensor 50) to be used in the acceleration detection step constitutes the acceleration detection unit. An unnecessary component is removed from the detected translational acceleration α by a BPF 56 (BPF: Band Pass Filter), and the translational acceleration is integrated by an integrating circuit 58. Thus, a translational velocity V of the shift shake Y is calculated. The calculated translational velocity V is input to a rotation radius calculation unit 70 (rotation radius calculation unit).

The angular velocity signal output from the angular velocity sensor 60 is input to a BPF 67, and a component of a frequency (for example, about 1 Hz to 10 Hz) of the angular shake θ generated by the camera shake is extracted from the angular velocity signal. Thereafter, a phase thereof is adjusted by a phase compensation circuit 68. The angular velocity signal is output as the angular velocity ω, and is input to the rotation radius calculation unit 70. The series of processing for calculating (detecting) the angular velocity ω from the angular velocity signal constitutes an angular velocity detection step. The series of components (including the angular velocity sensor 60) to be used in the angular velocity detection step constitutes an angular velocity detection unit. The angular velocity signal is input to the HPF 62, and an unnecessary component of the angular velocity signal is removed. Thereafter, the angular velocity signal is integrated by an integrating circuit 64, and an unnecessary component is removed by an HPF 66. Thus, the angular shake θ is calculated, and is input to a correction calculation unit 72 (correction calculation unit). The correction calculation unit 72 calculates a correction amount per unit shake angle and a polarity of the correction based on the rotation radius.

The shake correction device 44 includes a rotation radius determination unit 76 (rotation radius determination unit), a position controller 77 (shake correction unit), and a correction mechanism 78 (shake correction unit) in addition to the aforementioned components. The shake correction processing using these components will be described below.

Shake Correction Processing

Figure 4:
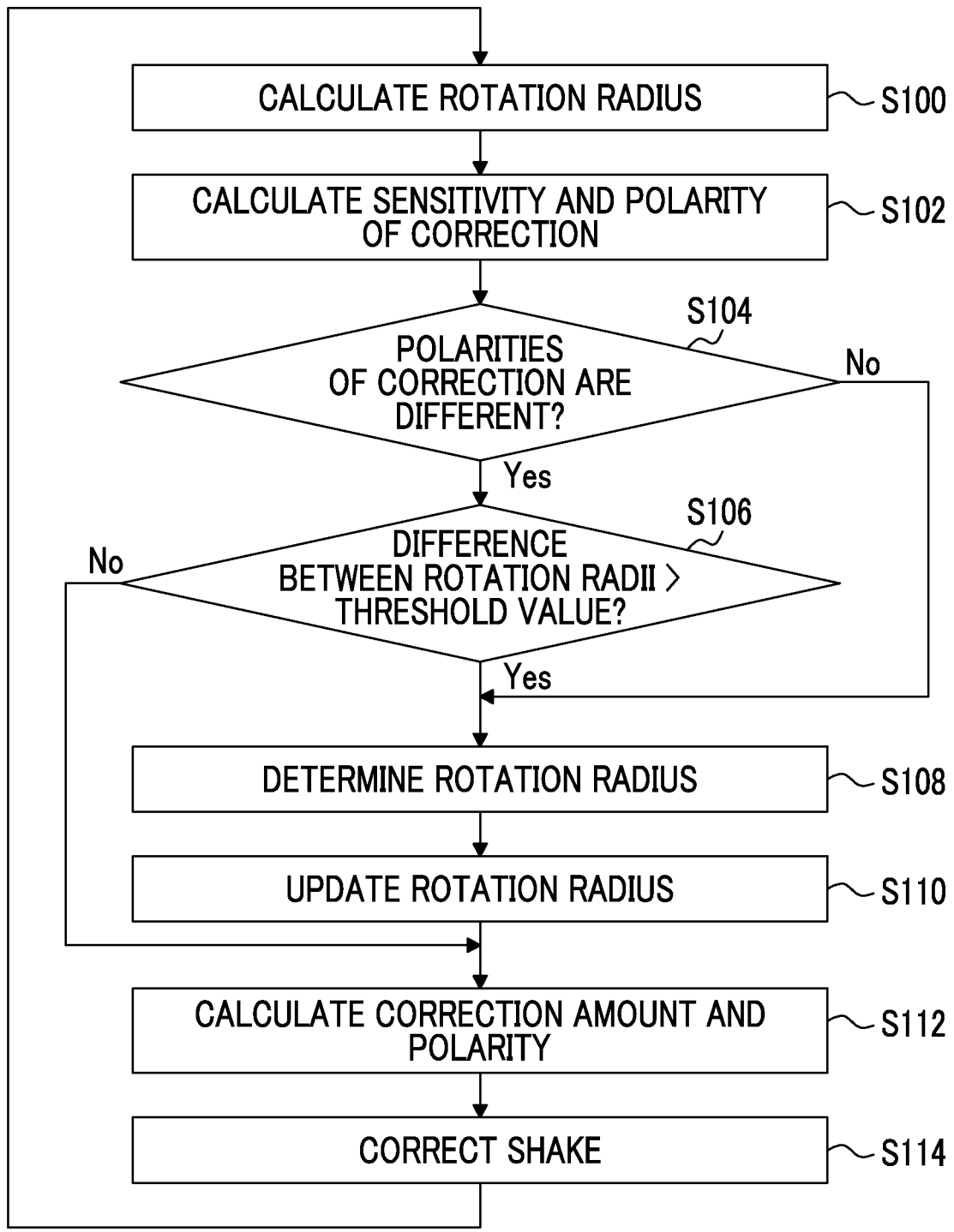
FIG. 4 is a flowchart showing the shake correction processing according to the first embodiment.

Next, the shake correction processing using the shake correction device 44 having the aforementioned configuration will be described. FIG. 4 is a flowchart showing the shake correction processing (shake correction method) of the first embodiment.

Initially, the rotation radius calculation unit 70 calculates the rotation radius R using the image surface IS (see FIG. 2) of the imaging element 22 based on the translational velocity V and the angular velocity ω detected based on the acceleration signal and the angular velocity signal as a reference surface (step S100: rotation radius calculation step). The rotation radius R can be calculated by the relationship of R=V/ω by using the translational velocity V and the angular velocity ω. The correction calculation unit 72 calculates the sensitivity and polarity of the shake correction based on the calculated rotation radius R (step S102: correction calculation step).

Figure 5:
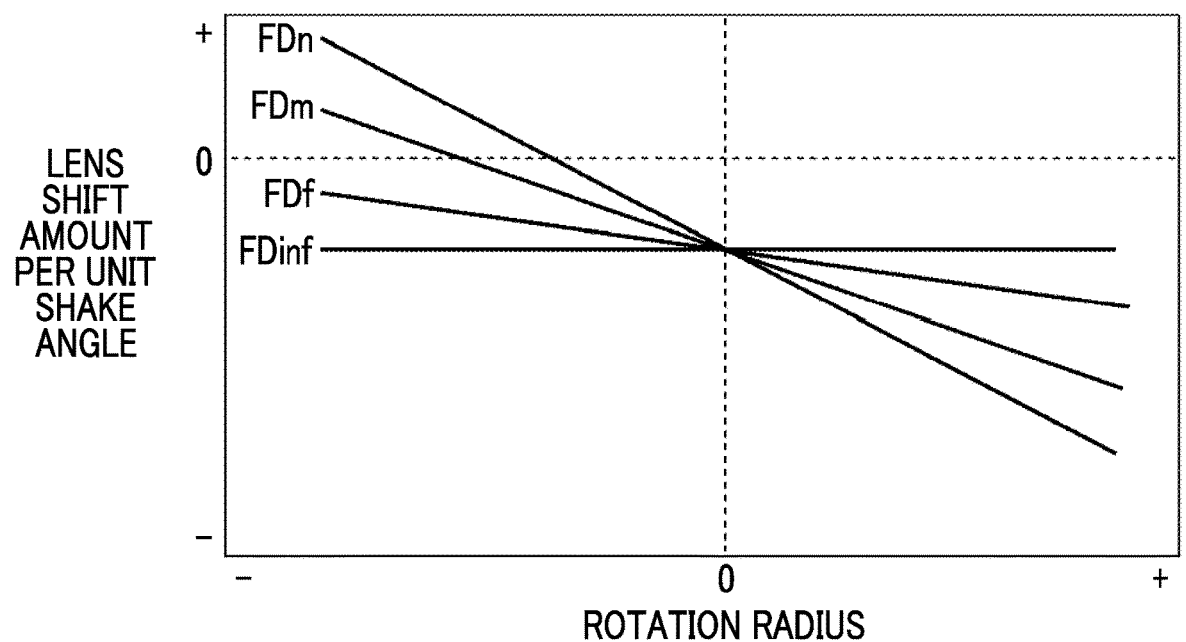
FIG. 5 is a diagram showing the relationship between a rotation radius and a correction amount per unit shake angle and a polarity according to the first embodiment.

FIG. 5 is a conceptual diagram showing the relationship between the rotation radius and a lens shift amount per unit shake angle. The correction calculation unit 72 calculates the sensitivity and polarity of the shake correction while referring to such a relationship stored in the correction calculation unit 72 in advance. The "sensitivity of the shake correction" is a correction amount per unit shake amount (the magnitude of the lens shift), and the "polarity of the shake correction" is a direction (positive or negative) of the correction (lens shift). The "sensitivity of the shake correction" is the same but the "polarity of the shake correction" is different depending on the value of the rotation radius R in some cases, and the sensitivity and polarity of the shake correction are also changed in a case where the rotation radius R is changed over time. Thus, in a case where the polarity is not taken into consideration in addition to the sensitivity of the shake correction, it is not possible to perform correct correction, and the influence of the shake may be rather increased. In the first embodiment, the parallel shake can be accurately corrected by taking the polarity into consideration in addition to the sensitivity of the shake correction.

In FIG. 5, relationships between the rotation radius and the lens shift amount per unit shake angle in cases where the focus distance is a nearest range, a middle range, a far range, and an infinity range are represented by references FDn, FDm, FDf, and FDinf, respectively. As shown in FIG. 5, the large a change in lens shift amount with respect to a change in rotation radius, the shorter the focus distance. The relationship of FIG. 5 is different depending on a zoom position in addition to the focus distance. Thus, the correction calculation unit 72 stores the plurality of relationships as shown in FIG. 5 depending on the focus distance and the zoom position, selects an appropriate relationship based on information (included in "zoom and focus information" described in FIG. 3) of the focus distance and the zoom position obtained from the imaging optical system 10, and calculates the sensitivity and polarity of the shake correction while referring to the selected relationship.

Referring back to the flowchart of FIG. 4, the shake correction processing will be continuously described. In step S104, the rotation radius determination unit 76 determines whether or not the polarity of the correction calculated in step S102 is different from the polarity of the correction corresponding to the rotation radius stored in the rotation radius determination unit 76 in advance (rotation radius determination step). The "rotation radius stored in advance" may be a fixed value, or may be updated during a period of the shake correction.

Figure 6:
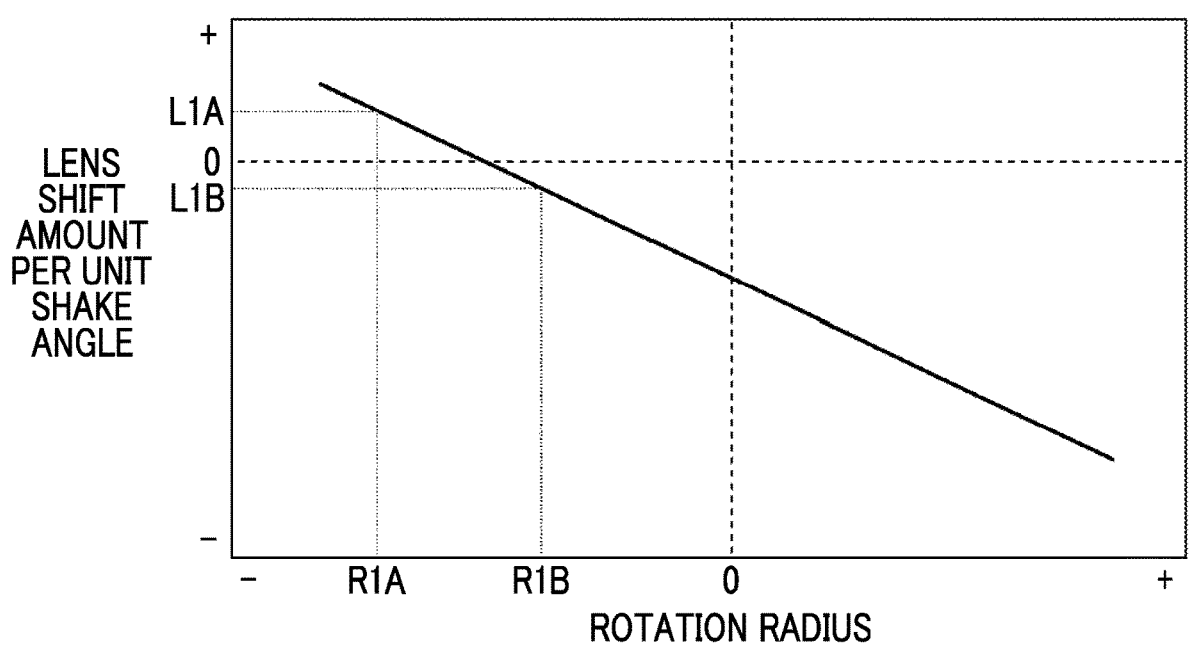
FIG. 6 is a diagram showing a scene in which a polarity corresponding to the calculated rotation radius is different from a polarity corresponding to a rotation radius stored in advance.

FIG. 6 is a diagram showing a scene in which the polarity of the correction corresponding to the calculated rotation radius is different from the polarity of the correction corresponding to the rotation radius stored in advance. In FIG. 6, the rotation radius stored in advance is a rotation radius R1A, and the lens shift amount corresponding to the rotation radius R1A is a shift amount L1A. The rotation radius calculated in step S100 is a rotation radius R1B, and the lens shift amount corresponding to the rotation radius R1B is a shift amount L1B. In this case, since the shift amount L1A is positive and the shift amount L1B is negative, the polarity (negative) of the correction calculated in step S102 is different from the polarity (positive) of the correction corresponding to the rotation radius stored in advance, and thus, the determination in step S104 is Yes.

Figure 7:
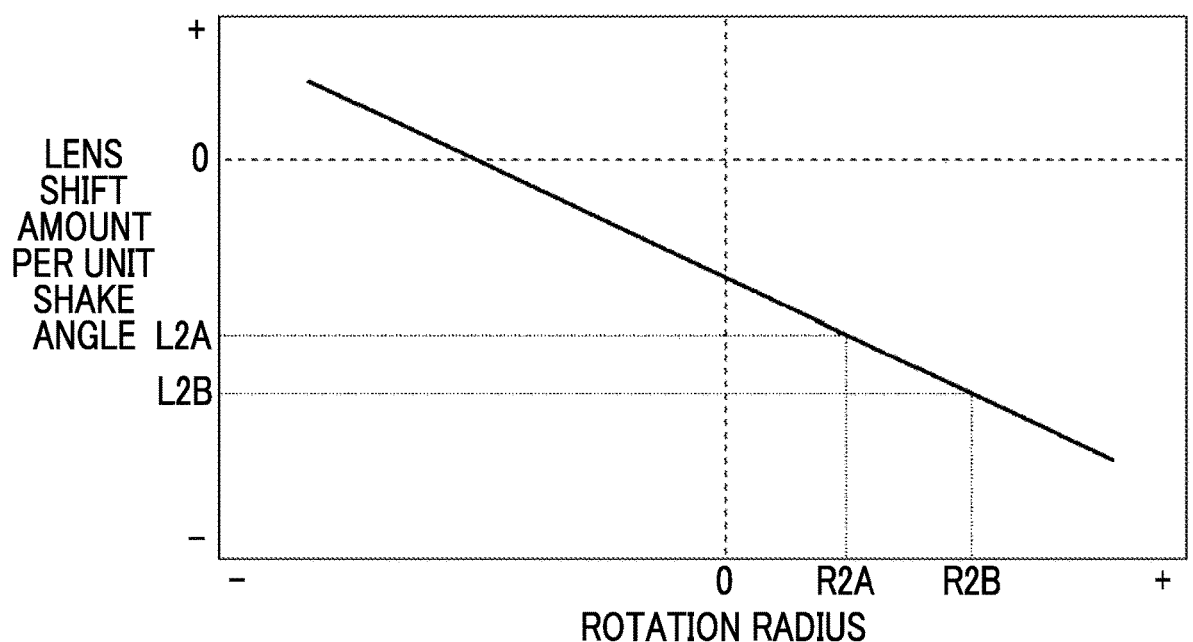
FIG. 7 is a diagram showing a scene in which the polarity corresponding to the calculated rotation radius is the same as the polarity corresponding to the rotation radius stored in advance.

FIG. 7 is a diagram showing a scene in which the polarity of the correction corresponding to the calculated rotation radius is the same as the polarity of the correction corresponding to the rotation radius stored in advance in the same situation of FIG. 6. In FIG. 7, the rotation radius stored in advance is a rotation radius R2A, and the lens shift amount corresponding to the rotation radius R2A is a shift amount L2A. The rotation radius calculated in step S100 is a rotation radius R2B, and the lens shift amount corresponding to the rotation radius R2B is a shift amount L2B. In this case, the polarity (negative) of the correction calculated in step S102 is the same as the polarity (negative) of the correction corresponding to the rotation radius stored in advance, and thus, the determination in step S104 is No.

In a case where the determination in step S104 is Yes, the rotation radius determination unit proceeds to step S106. In a case where the determination is No, the rotation radius determination unit skips step S106, and proceeds to step S108.

Figure 8:
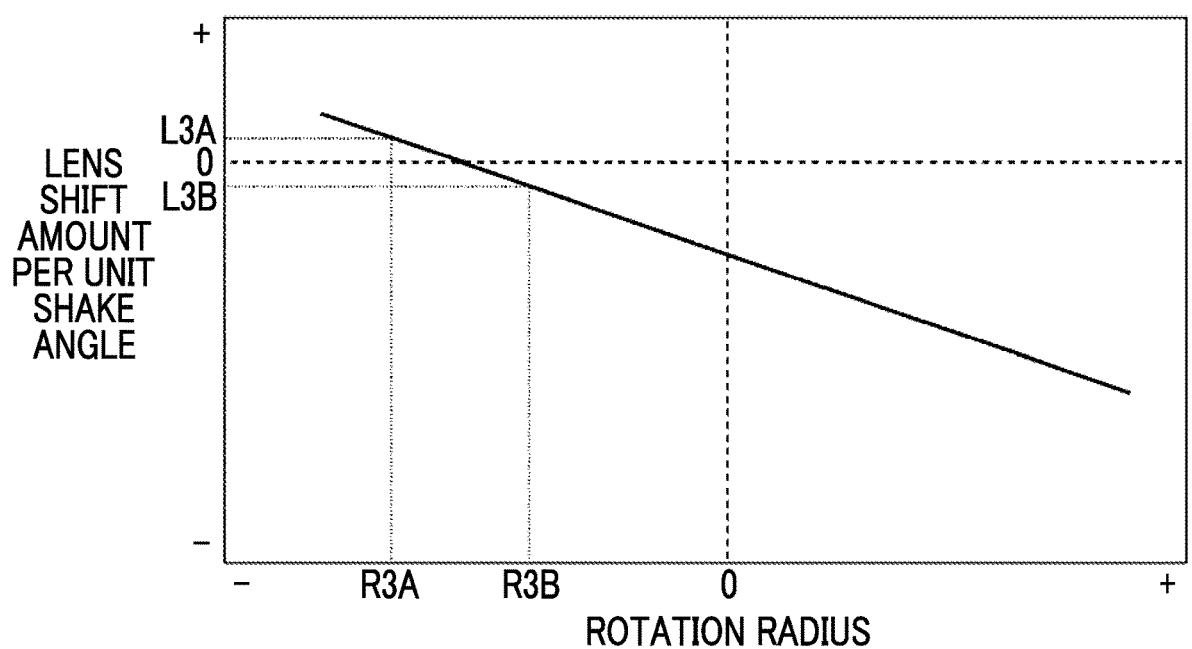
FIG. 8 is a diagram for describing a scene in which whether or not a change in rotation radius is larger than a threshold value is determined.

In step S106, the rotation radius determination unit 76 determines "whether or not a difference between the rotation radius calculated in step S100 and the rotation radius stored in the rotation radius determination unit 76 in advance is larger than a rotation radius calculation threshold value (rotation radius determination step). An example of the determination in step S106 will be described with reference to FIG. 8. In FIG. 8, the rotation radius stored in advance is a rotation radius R3A, and the lens shift amount corresponding to the rotation radius R3A is a shift amount L3A. The rotation radius calculated in step S100 is a rotation radius R3B, and the lens shift amount corresponding to the rotation radius R3B is a shift amount L3B. Accordingly, the rotation radius determination unit determines "whether or not |R3B−R3A|> rotation radius calculation threshold value" in this case.

In the shake correction processing, even though the polarity of the correction corresponding to the rotation radius calculated in step S100 is different from the polarity corresponding to the rotation radius stored in advance (the polarity of the shift amount L1B is different from the polarity of the shift amount L1A in FIG. 6), in a case where the change amount of the rotation radius is small (a case where the change amount thereof is equal to or smaller than a threshold value), there is a possibility that the polarity will be changed due to a calculation error. In the first embodiment, in a case where the polarity corresponding to the calculated rotation radius is different from the polarity corresponding to the rotation radius stored in advance and the difference between the calculated rotation radius and the rotation radius stored in advance is larger than the rotation radius calculation threshold value (for example, in a case where |R3B−R3A|> threshold value in FIG. 8), the rotation radius determination unit 76 determines the rotation radius calculated in step S100 as the rotation radius to be used in the shake correction. Accordingly, in a case where it is certain that the rotation radius is changed and the polarity of the correction is consequently changed, since the rotation radius determination unit can determine the rotation radius calculated in step S100 as the rotation radius to be used in the shake correction, it is possible to accurately correct the parallel shake, and it is possible to prevent an erroneous operation due to a frequent change in polarity. The rotation radius calculation threshold value can be set with consideration for calculation accuracy (for example, about 10 mm).

In a case where the determination in step S106 is Yes, the rotation radius determination unit proceeds to step S108. The rotation radius determination unit 76 determines the rotation radius calculated in step S100 as the rotation radius to be used in the shake correction (rotation radius determination step), and proceeds to step S110. In a case where the determination is No, the rotation radius determination unit skips steps S108 and S110, and proceeds to step S112 while maintaining the rotation radius stored in the rotation radius determination unit 76.

In step S110, the rotation radius determination unit 76 updates the "rotation radius stored in the rotation radius determination unit 76 in advance" based on the rotation radius determined in step S108. The "updating" of the rotation radius may be performed by replacing the rotation radius stored in advance with the rotation radius determined in step S108, or may be performed by calculating a new value acquired by taking the determined rotation radius (for example, a weighted average value acquired by taking the history of changes in rotation radius into consideration).

In step S112, the correction calculation unit 72 calculates the sensitivity and polarity of the correction corresponding to the rotation radius determined in step S108, and determines the correction amount (magnitude) and polarity (direction) of the shake correction (angular shake and the parallel shake) based on the calculation result and the shake amount (calculated based on the angular shake θ the shift shake Y, the zoom information, and the focus information). In a case where the rotation radius calculated in step S100 is determined as the "rotation radius to be used in the shake correction", the sensitivity and polarity of the correction may not be calculated again in step S112. For example, the shake amount can be obtained as $(1+\beta)f\theta+\beta R\theta$ by using an imaging zoom ratio β (an example of the focus information), a focal length f (an example of the zoom information), the angular shake θ, and the rotation radius R. Rθ of the second term represents the shift shake Y.

The correction mechanism 78 controls the position controller 77 by using the correction amount and polarity determined in step S112, and drives the shake correction lens 16 (step S114: shake correction step). The correction mechanism 78 includes an actuator (such as a voice coil motor or a stepping motor) that drives the shake correction lens 16 in the plane perpendicular to the optical axis L. The shake correction lens 16 is driven in two orthogonal axis directions. The shake correction lens may be driven while feeding back the driving result to the position controller 77.

The shake correction device 44 repeatedly performs the aforementioned shake correction processing (step S100 to step S114) within the period of the shake correction (for example, during an exposure period of the live view image mode, the static image imaging mode, and the video imaging mode).

Advantageous Effects of First Embodiment

As described above, according to the digital camera 100 according to the first embodiment, since the polarity of the correction and the rotation radius calculation threshold value are taken into consideration, it is possible to accurately correct the parallel shake, and it is possible to prevent the erroneous operation due to the frequent change in polarity.

Second Embodiment

Next, a second embodiment of the shake correction device, the imaging apparatus, and the shake correction method of the present invention will be described.

Figure 9:
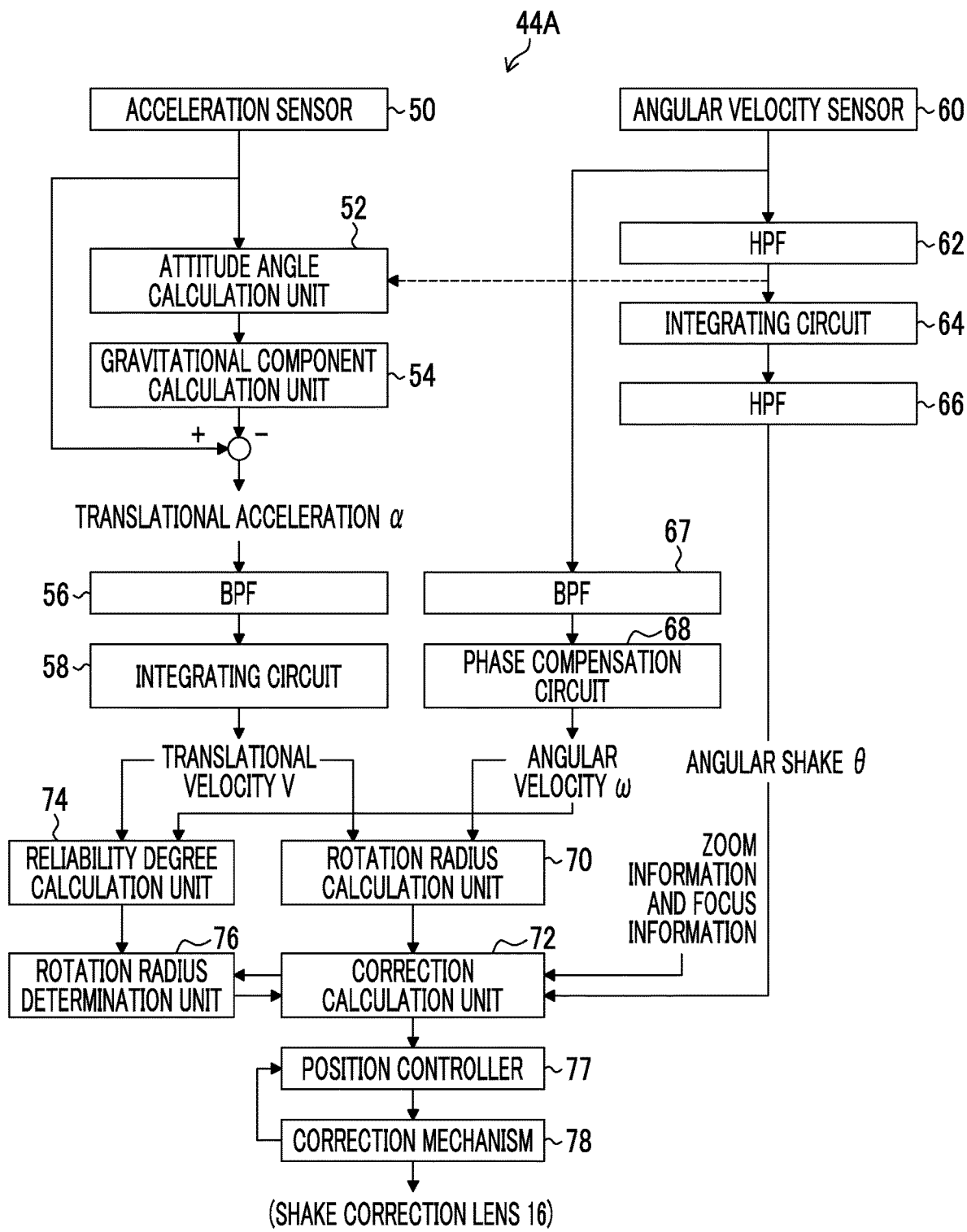
FIG. 9 is a schematic diagram showing a configuration of a shake correction device and shake correction processing according to a second embodiment.

FIG. 9 is a diagram showing a configuration of a shake correction device 44A according to a second embodiment. The shake correction device 44A is different from the shake correction device 44 (see FIG. 3) according to the first embodiment in that a reliability degree calculation unit 74 (reliability degree calculation unit) is comprised. Since other configurations of the shake correction device 44A are the same as those of the shake correction device 44, the same components will be assigned the same references, and the detailed description thereof will be omitted. Since a configuration of the imaging apparatus is the same as that of the digital camera 100 according to the first embodiment except for the shake correction device 44A, the detailed description thereof will be omitted.

Figure 10:
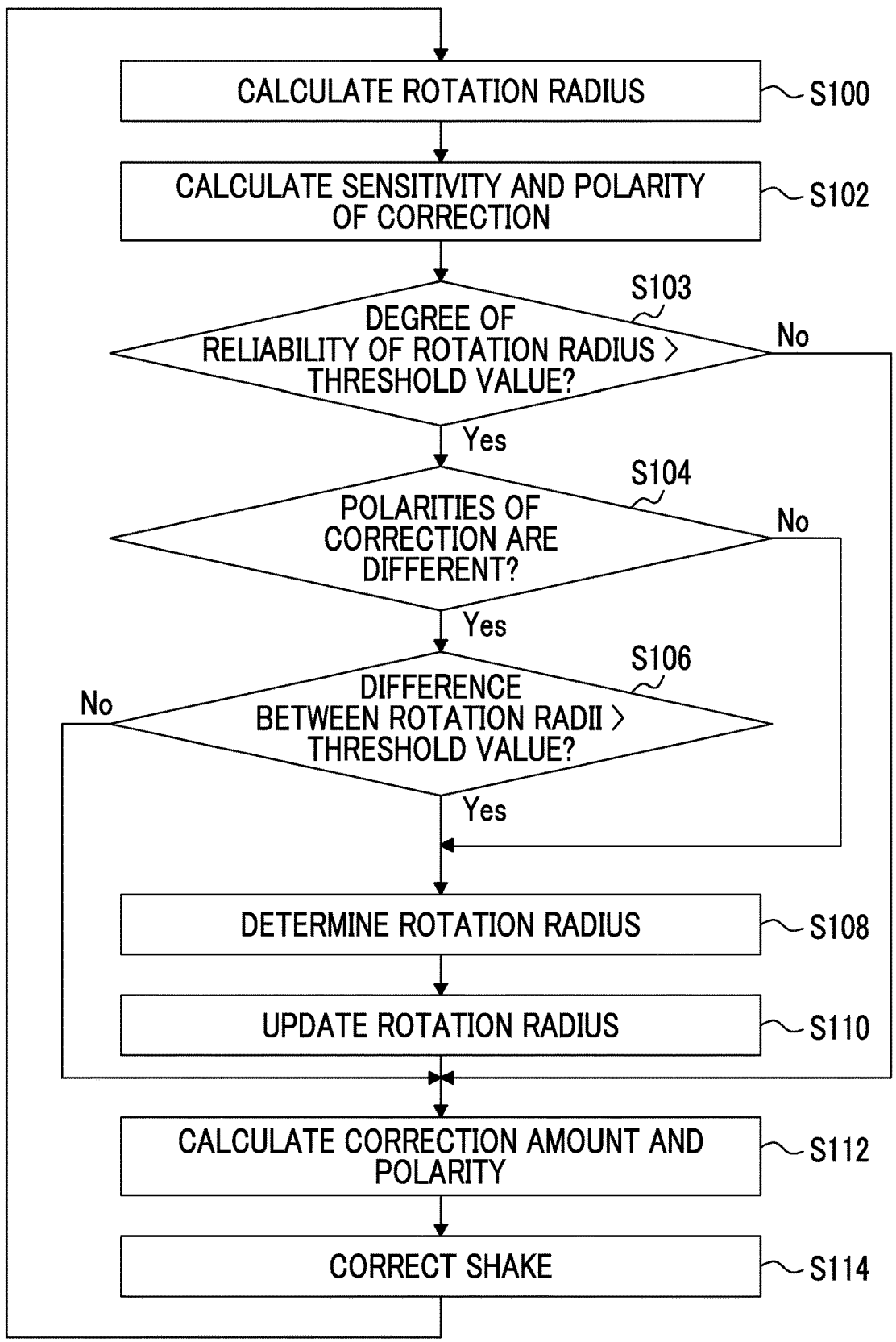
FIG. 10 is a flowchart showing the shake correction processing according to the second embodiment.

FIG. 10 is a flowchart showing shake correction processing (shake correction method) according to the second embodiment. The flowchart of FIG. 10 is different from the flowchart of FIG. 4 in that processing in step S103 is provided.

In step S103, the aforementioned reliability degree calculation unit 74 (see FIG. 9) determines whether or not a degree of reliability of the rotation radius calculated in step S100 is larger than a threshold value. Specifically, the degree of reliability can be calculated based on the value of the angular velocity ω. For example, in a case where the angular velocity ω is substantially zero, since there is a possibility that the digital camera 100 will be fixed on a tripod, the degree of reliability of the rotation radius is degraded. In a case where a situation in which the sign of the angular velocity ω is not changed is continued, there is a possibility of panning, and the degree of reliability of the rotation radius is also deteriorated in this case. The degree of reliability may be calculated based on the value of the rotation radius R. In this case, in a case where the rotation radius exceeding the length of human arm is calculated or the sign of the rotation radius is frequently changed, the degree of reliability of the rotation radius is also deteriorated. The threshold value for the degree of reliability of the rotation radius can be set by taking stability of an operation of the correction mechanism 78 or the accuracy of the shake correction into consideration.

In a case where the degree of reliability of the rotation radius calculated in this manner is larger than the threshold value, the determination in step S103 is Yes. The rotation radius determination unit proceeds to step S104, and performs the same processing as the processing of the flowchart of FIG. 4. Meanwhile, in a case where the degree of reliability is equal to or smaller than the threshold value, the determination is No, and the rotation radius determination unit proceeds to step S112 without updating the rotation radius. The rotation radius determination unit determines the rotation radius stored in advance as the rotation radius to be used in the shake correction, and performs the shake correction based on the correction amount and polarity corresponding to this rotation radius. Since the flowchart of FIG. 10 is the same as the flowchart of FIG. 4 except for the processing in step S103, the same processing will be assigned the same step numbers as those of FIG. 4, and the detailed description thereof will be omitted.

Advantageous Effect of Second Embodiment

Similarly to the first embodiment, according to the second embodiment, since the degree of reliability of the rotation radius is taken into consideration (whether or not the degree of reliability is larger than the threshold value) in addition to taking the polarity of the correction and the threshold value for the change in rotation radius into consideration, it is possible to accurately correct the parallel shake, and it is possible to prevent the erroneous operation due to the frequent change in polarity.

Third Embodiment

Next, a third embodiment of the shake correction device, the imaging apparatus, and the shake correction method of the present invention will be described.

In the third embodiment, since a configuration of the shake correction device is the same as the shake correction device 44A of FIG. 9, the detailed description thereof will be omitted. Since a configuration of the imaging apparatus is the same as that of the digital camera 100 according to the first embodiment except for the shake correction device 44A, the detailed description thereof will be omitted.

Figure 11:
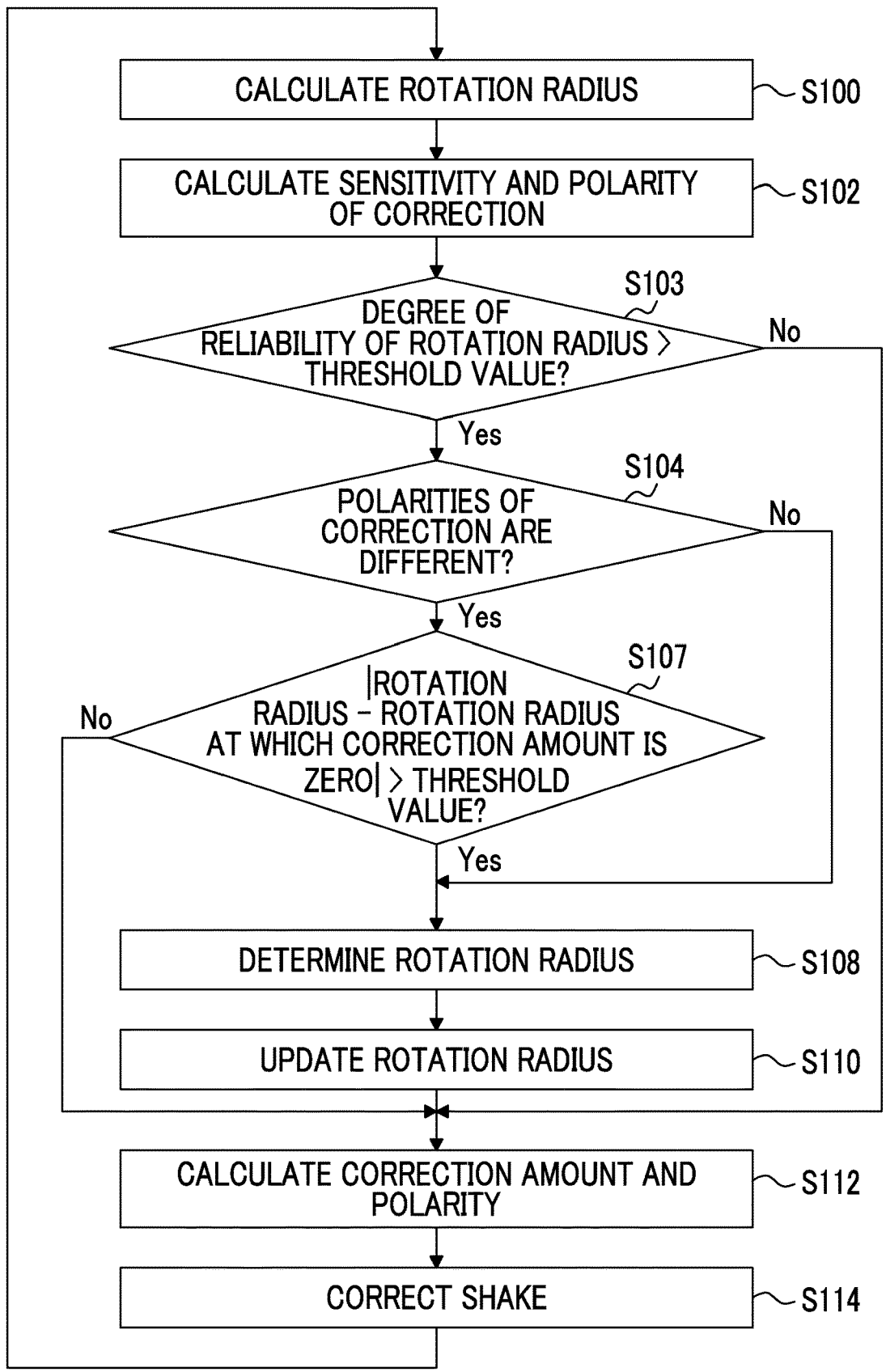
FIG. 11 is a flowchart showing shake correction processing according to a third embodiment.

FIG. 11 is a flowchart showing shake correction processing (shake correction method) according to the third embodiment. The flowchart of FIG. 11 is different from the flowchart of FIG. 4 in that step S103 is provided, and is different from the flowchart of FIG. 10 in that step S107 is provided instead of step S106. The determination of the degree of reliability in step S103 is the same as that of the second embodiment (see FIG. 10).

Figure 12:
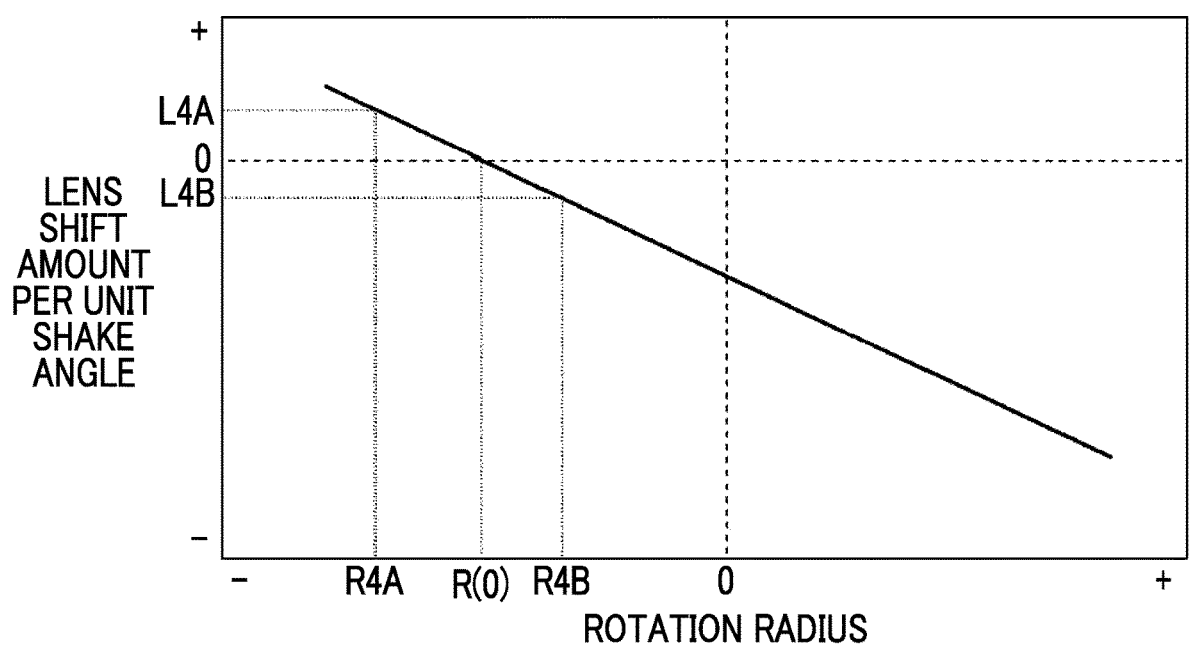
FIG. 12 is a diagram for describing the determination of the rotation radius according to the third embodiment.

Processing in step S107 will be described with reference to FIG. 12. In the third embodiment, in a case where the polarity corresponding to the rotation radius calculated in step S100 is different from the polarity corresponding to the rotation radius stored in advance (the determination in step S104 is Yes) and a difference between the rotation radius calculated in step S100 and a rotation radius at which the correction amount (lens shift amount) is zero is larger than a threshold value, the rotation radius determination unit 76 determines the rotation radius calculated in step S100 as the rotation radius to be used in the shake correction. This threshold value can be set by taking the calculation accuracy of the rotation radius or the stability of the correction into consideration. In the example of FIG. 12, the rotation radius stored in advance is R4A, and the lens shift amount corresponding to this rotation radius is L4A. Meanwhile, the rotation radius calculated in step S100 is a rotation radius R4B, and the lens shift amount corresponding to this rotation radius is a shift amount L4B. The rotation radius at which the correction amount is zero is rotation radius R(0).

Accordingly, in this case, the rotation radius determination unit determines "whether or not |R4B−R(0)|> threshold value" in step S107. In a case where this determination is Yes, the rotation radius determination unit 76 proceeds to step S108, determines the rotation radius calculated in step S100 as the rotation radius to be used in the shake correction (rotation radius determination step), and proceeds to step S110. In a case where this determination is No, the rotation radius determination unit 76 skips steps S108 and S110, and proceeds to step S112 while maintaining the rotation radius stored in the rotation radius determination unit. The processing in step S114 and the subsequent steps is the same as those of the flowcharts of FIGS. 4 and 10.

Advantageous Effect of Third Embodiment

According to the third embodiment, in a case where it is certain that the rotation radius is changed and the polarity of the correction is consequently changed (the difference between the calculated rotation radius and the rotation radius at which the correction amount is zero is larger than the threshold value), since the calculated rotation radius is determined as the rotation radius to be used in the shake correction, it is possible to accurately correct the parallel shake, and it is possible to prevent an erroneous operation due to a frequent change in polarity. Although it has been described in this example that the shake correction device 44A comprises the reliability degree calculation unit 74 and the processing in step S103 is performed in the shake correction, this configuration may be omitted in the third embodiment.

Fourth Embodiment

Next, a fourth embodiment of the shake correction device, the imaging apparatus, and the shake correction method of the present invention will be described.

In the fourth embodiment, since a configuration of the shake correction device is the same as the shake correction device 44A of FIG. 9, the detailed description thereof will be omitted. Since a configuration of the imaging apparatus is the same as that of the digital camera 100 according to the first embodiment except for the shake correction device 44A, the detailed description thereof will be omitted.

Figure 13:
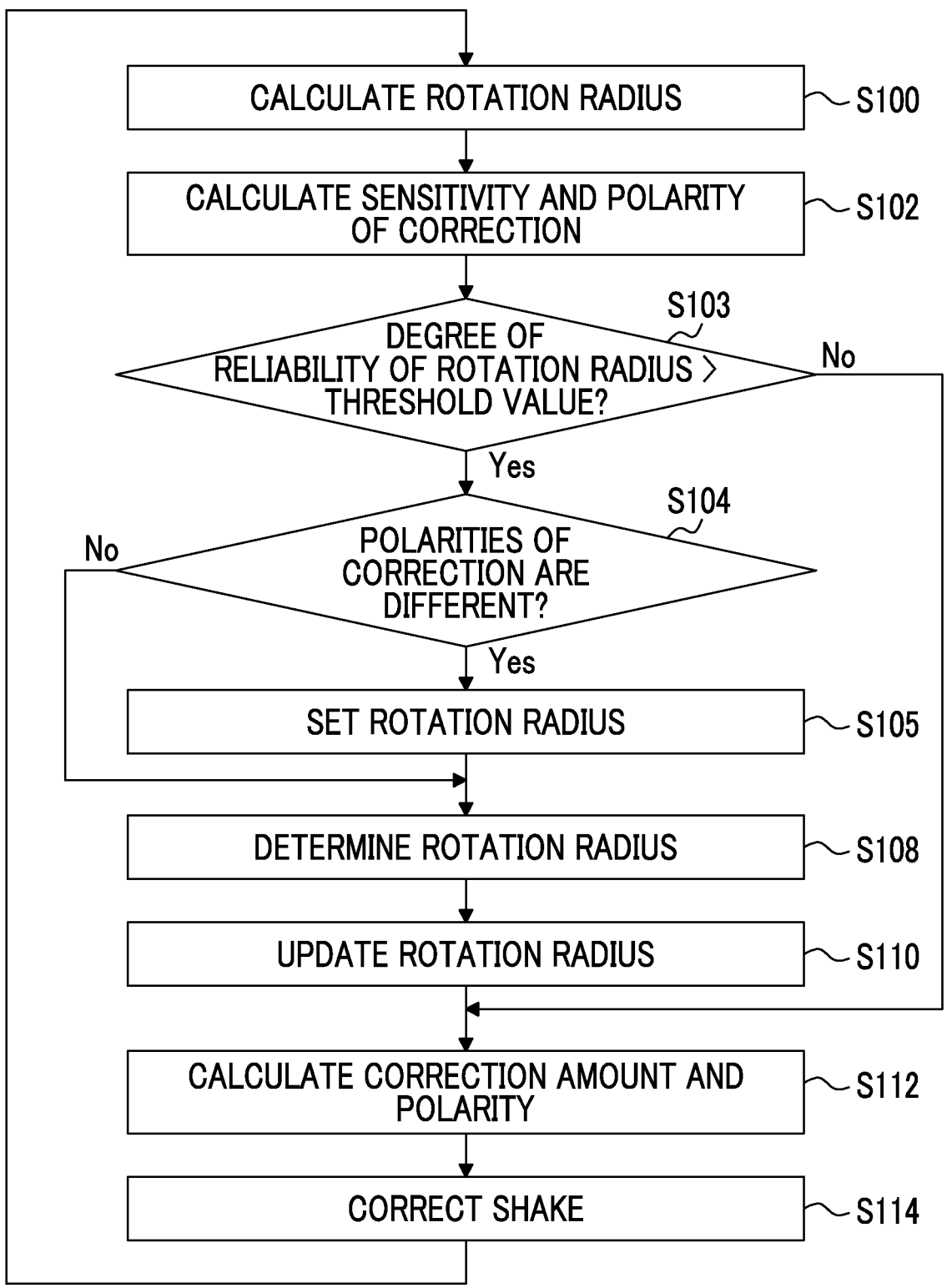
FIG. 13 is a flowchart showing shake correction processing according to a fourth embodiment.

FIG. 13 is a flowchart showing shake correction processing (shake correction method) according to the fourth embodiment. The flowchart of FIG. 13 is different from the flowchart of FIG. 4 in that step S103 is provided, and is different from the flowcharts of FIGS. 10 and 11 in that step S105 is provided instead of steps S106 and S107. The determination of the degree of reliability in step S103 is the same as that of the second embodiment (see FIG. 10).

Figure 14:
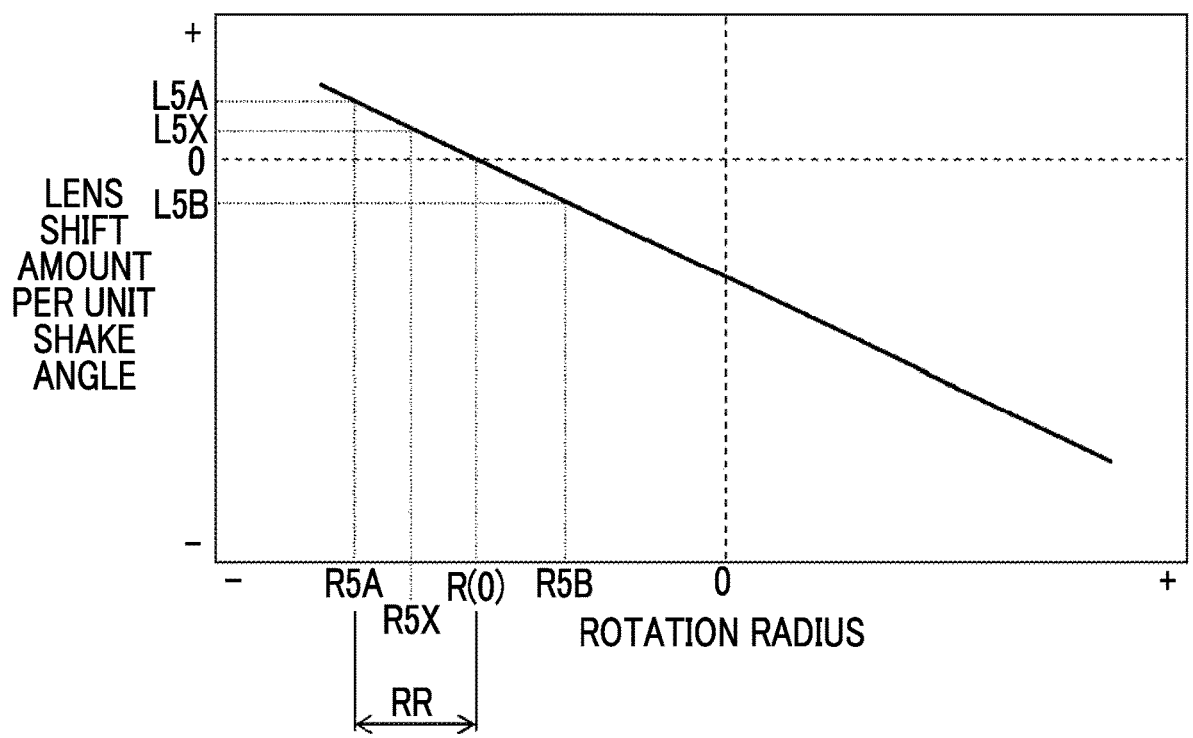
FIG. 14 is a diagram for describing the determination of the rotation radius according to the fourth embodiment.

Processing in step S105 will be described with reference to FIG. 14. In the fourth embodiment, in a case where the polarity corresponding to the rotation radius calculated in step S100 is different from the polarity corresponding to the rotation radius stored in advance, the rotation radius determination unit 76 determines a rotation radius set between the rotation radius stored in advance and the rotation radius at which the correction amount (lens shift amount) is zero as the rotation radius to be used in the shake correction. In the example of FIG. 14, the rotation radius stored in advance is R5A, and the lens shift amount corresponding to this rotation radius is L5A. Meanwhile, the rotation radius calculated in step S100 is a rotation radius R5B, and the lens shift amount corresponding to this rotation radius is a shift amount L5B. The rotation radius at which the correction amount is zero is rotation radius R(0).

Accordingly, in this case, the rotation radius determination unit 76 sets any rotation radius R5X (rotation radius R5A≤rotation radius R5X≤rotation radius R(0)) in a range RR (see FIG. 14) from the rotation radius R5A to the rotation radius R(0) (step S105), and the position controller 77 and the correction mechanism 78 drive the shake correction lens 16 based on the shift amount L5X and polarity (positive in FIG. 14) corresponding to the rotation radius R5X (steps S108 and S114). The processing in step S114 and the subsequent steps is the same as those of the flowcharts of FIGS. 4, 10, and 11.

Advantageous Effect of Fourth Embodiment

According to the fourth embodiment, it is possible to accurately correct the parallel shake, and it is possible to prevent the erroneous operation due to the frequent change in polarity since the correction is not performed at a polarity opposite to the polarity corresponding to the rotation radius stored in advance. Although it has been described in this example that the shake correction device 44A comprises the reliability degree calculation unit 74 and the processing in step S103 is performed in the shake correction, this configuration may be omitted in the fourth embodiment.

Fifth Embodiment

Figure 15:
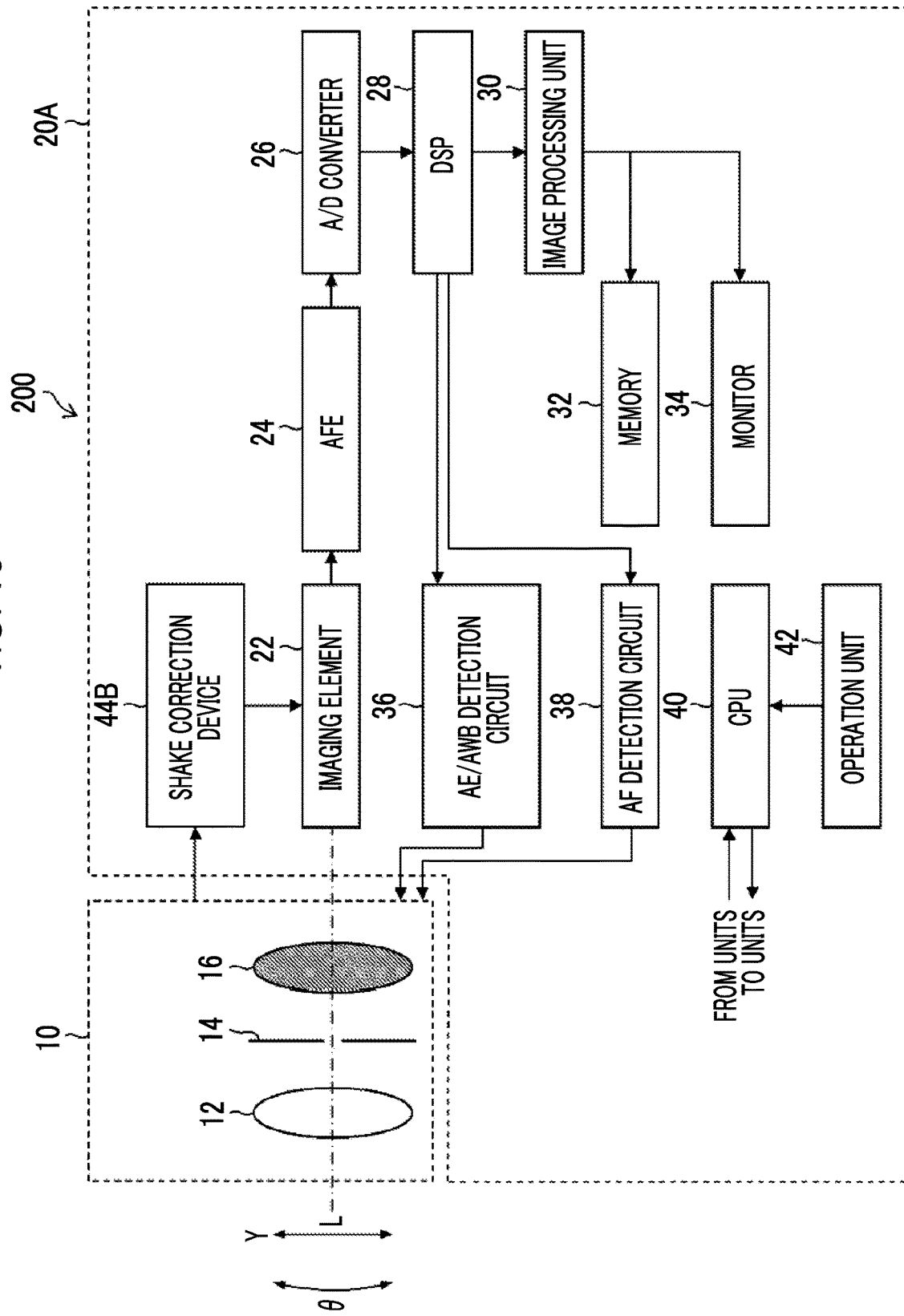
FIG. 15 is a block diagram showing a configuration of an imaging apparatus according to a fifth embodiment.

Next, a fifth embodiment of the shake correction device, the imaging apparatus, and the shake correction method of the present invention will be described. FIG. 15 is a block diagram showing a configuration of a digital camera 200 according to the fifth embodiment. Although it has been described in the first to fourth embodiments that the shake correction is performed by driving the shake correction lens 16 by using the shake correction devices 44 and 44A, the shake correction is performed by driving the imaging element 22 by using a shake correction device 44B comprised in a camera main body 20A in the digital camera 200 according to the fifth embodiment. A configuration of the shake correction device 44B can be the same as those of the shake correction devices 44 and 44A. The reliability degree calculation unit 74 may be provided, may calculate the degree of reliability of the rotation radius, and may perform the processing (see step S103 of FIGS. 10, 11, and 13) based on the calculated degree of reliability.

Figure 16:
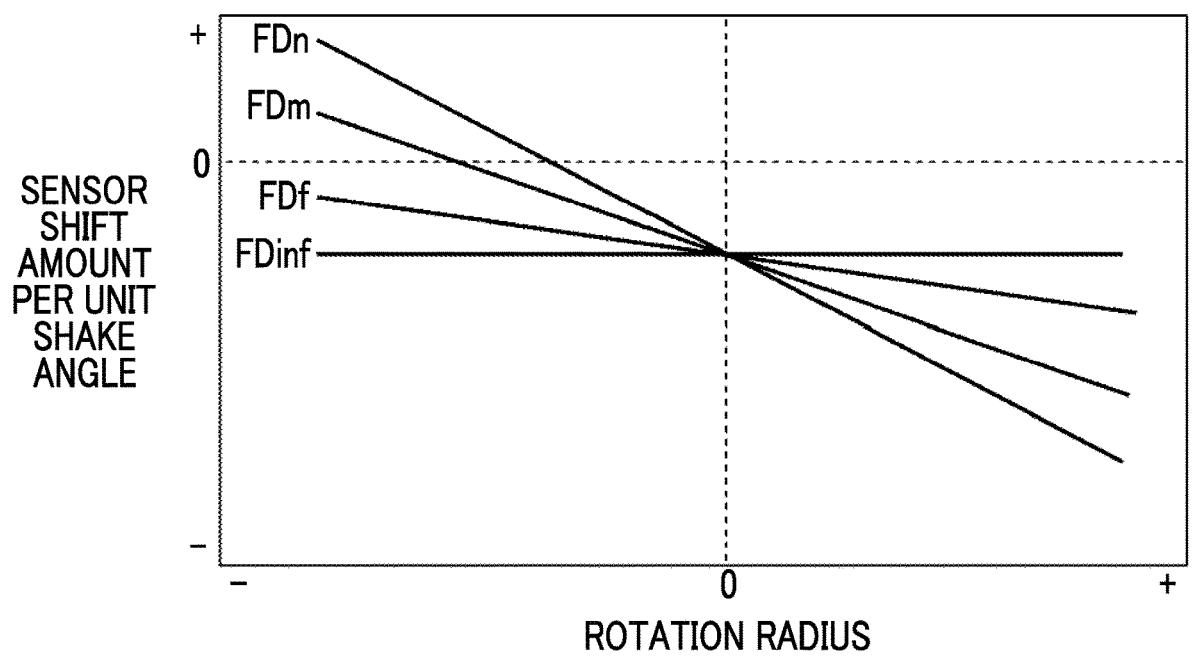
FIG. 16 is a diagram showing the relationship between a rotation radius and a correction amount per unit shake angle and a polarity according to the fifth embodiment.

FIG. 16 is a diagram showing the relationship between the rotation radius and a sensor shift amount. Similarly to the relationship (see FIG. 5) between the rotation radius and the lens shift amount, the relationship between the rotation radius and the sensor shift amount is also different depending on the focus distance and the zoom position. In FIG. 16, relationships between the rotation radius and the sensor shift amount per unit shake angle in cases where the focus distance is a nearest range, a middle range, a far range, and an infinity range are represented by references FDn, FDm, FDf, and FDinf, respectively.

Under the aforementioned configuration, the shake correction processing in the fifth embodiment can be performed similarly to the first to fourth embodiments, and thus, the parallel shake can be accurately corrected.

Others

Although it has been described in the first to fifth embodiments that the shake is corrected by driving the shake correction lens 16 or the imaging element 22, both the shake correction lens 16 and the imaging element 22 may be driven. In this case, the shake correction lens 16 and the imaging element 22 may be driven by taking whether or not the polarity of the correction is changed by the updating of the rotation radius. The imaging optical system 10 may be an interchangeable lens. The shake correction device, the imaging apparatus, and the shake correction method of the present invention can be applied to a camera function installed in an electronic device such as a smartphone or a tablet terminal in addition to the typical digital camera.

While the embodiments of the present invention have been described, the present invention is not limited to the aforementioned embodiments, and can be variously modified without departing from the gist of the present invention.

EXPLANATION OF REFERENCES

10: imaging optical system
12: imaging lens
14: stop
16: shake correction lens
20: camera main body
20A: camera main body
22: imaging element
24: AFE
26: A/D converter
28: DSP
30: image processing unit
32: memory
34: monitor
36: AE/AWB detection circuit
38: AF detection circuit
40: CPU
42: operation unit
44: shake correction device
44A: shake correction device
44B: shake correction device 50: acceleration sensor
52: attitude angle calculation unit
54: gravitational component calculation unit
56: BPF
58: integrating circuit
60: angular velocity sensor
62: HPF
64: integrating circuit
66: HPF
67: BPF
68: phase compensation circuit
70: rotation radius calculation unit
72: correction calculation unit
74: reliability degree calculation unit
76: rotation radius determination unit
77: position controller
78: correction mechanism
100: digital camera
200: digital camera
C: rotation center
IS: image surface
L: optical axis
L1A: shift amount
L1B: shift amount
L2A: shift amount
L2B: shift amount
L3A: shift amount
L3B: shift amount
L4B: shift amount
L5B: shift amount
L5X: shift amount
R: rotation radius
R1A: rotation radius
R1B: rotation radius
R2A: rotation radius
R2B: rotation radius
R3A: rotation radius
R3B: rotation radius
R4B: rotation radius
R5A: rotation radius
R5B: rotation radius
R5X: rotation radius
RR: range
S100 to S114: steps of shake correction processing
V: translational velocity
Y: shift shake
α: translational acceleration
θ: angular shake
ω: angular velocity

What is claimed is:

1. A shake correction device comprising:
an angular velocity detector that detects an angular velocity of a shake;
an acceleration detector that detects an acceleration of the shake;
a rotation radius calculator that calculates a rotation radius around a reference surface of the shake based on the detected angular velocity and acceleration;
a correction calculator that calculates a correction amount per unit shake angle and a polarity of correction for the shake based on the calculated rotation radius;
a rotation radius determiner that determines a rotation radius to be used in the correction of the shake based on the calculated rotation radius and whether or not the polarity corresponding to the calculated rotation radius is different from a polarity corresponding to a rotation radius stored in advance; and
a shake corrector that performs the correction for the shake based on a correction amount and a polarity corresponding to the determined rotation radius.

2. The shake correction device according to claim 1, wherein the correction calculator calculates the correction amount and the polarity for the shake while referring to a relationship between the rotation radius and the correction amount per unit shake angle and the polarity of the correction.

3. The shake correction device according to claim 1, wherein, in a case where the polarity corresponding to the calculated rotation radius is different from the polarity corresponding to the rotation radius stored in advance and a difference between the calculated rotation radius and the rotation radius stored in advance is larger than a rotation radius calculation threshold value, the rotation radius determiner determines the calculated rotation radius as the rotation radius to be used in the correction of the shake.

4. The shake correction device according to claim 1, wherein, in a case where the polarity corresponding to the calculated rotation radius is different from the polarity corresponding to the rotation radius stored in advance and a difference between the calculated rotation radius and a rotation radius at which the correction amount is zero is larger than a threshold value, the rotation radius determiner determines the calculated rotation radius as the rotation radius to be used in the correction of the shake.

5. The shake correction device according to claim 1, wherein, in a case where the polarity corresponding to the calculated rotation radius is different from the polarity corresponding to the rotation radius stored in advance, the rotation radius determiner determines a rotation radius set between the rotation radius stored in advance and a rotation radius at which the correction amount is zero as the rotation radius to be used in the correction of the shake.

6. The shake correction device according to claim 1, further comprising:
a reliability degree calculator that calculates a degree of reliability of the rotation radius,
wherein, in a case where the calculated degree of reliability is equal to or smaller than a threshold value, the rotation radius determiner determines the rotation radius stored in advance instead of the calculated rotation radius as the rotation radius to be used in the correction of the shake.

7. The shake correction device according to claim 1, wherein the rotation radius determiner updates the rotation radius stored in advance based on the determined rotation radius.

8. An imaging apparatus comprising:
an imaging optical system;
an imaging element on which an optical image of a subject is formed by the imaging optical system; and
the shake correction device according to claim 1,
wherein the shake corrector performs the correction for the shake by driving at least one of the imaging optical system or the imaging element at the calculated correction amount and polarity in a plane perpendicular to an optical axis of the imaging optical system.

9. A shake correction method comprising:
an angular velocity detection step of detecting an angular velocity of a shake;
an acceleration detection step of detecting an acceleration of the shake;

- a rotation radius calculation step of calculating a rotation radius around a reference surface of the shake based on the detected angular velocity and acceleration;
- a correction calculation step of calculating a correction amount per unit shake angle and a polarity of correction for the shake based on the calculated rotation radius;
- a rotation radius determination step of determining a rotation radius to be used in the correction of the shake based on the calculated rotation radius and whether or not the polarity corresponding to the calculated rotation radius is different from a polarity corresponding to a rotation radius stored in advance; and
- a shake correction step of performing the correction for the shake based on a correction amount and a polarity corresponding to the determined rotation radius.

* * * * *